United States Patent
Alper

(10) Patent No.: US 9,504,946 B2
(45) Date of Patent: *Nov. 29, 2016

(54) PROCESS AND SYSTEM FOR SEPARATING FINELY AEROSOLIZED ELEMENTAL MERCURY FROM GASEOUS STREAMS

(71) Applicant: MYCELX TECHNOLOGIES CORPORATION, Duluth, GA (US)

(72) Inventor: Hal Alper, Flowery Branch, GA (US)

(73) Assignee: MYCELX TECHNOLOGIES CORPORATION, Duluth, GA (US)

( * ) Notice: Subject to any disclaimer, the term of this patent is extended or adjusted under 35 U.S.C. 154(b) by 118 days.

This patent is subject to a terminal disclaimer.

(21) Appl. No.: 14/480,314

(22) Filed: Sep. 8, 2014

(65) Prior Publication Data

US 2014/0373715 A1 Dec. 25, 2014

Related U.S. Application Data

(63) Continuation-in-part of application No. 13/392,357, filed as application No. PCT/US2010/002356 on Aug.

(Continued)

(51) Int. Cl.
  *B01D 50/00* (2006.01)
  *B01D 53/64* (2006.01)
  (Continued)

(52) U.S. Cl.
  CPC ......... *B01D 46/0023* (2013.01); *B01D 39/086* (2013.01); *B01D 39/12* (2013.01); *B01D 46/002* (2013.01); *B01D 46/2407* (2013.01)

(58) Field of Classification Search
  CPC B01D 39/086; B01D 39/12; B01D 39/2027; B01D 39/2041; B01D 46/002; B01D 46/0023; B01D 46/2407
  USPC ............ 95/285; 55/315, 318, 430, 431, 434, 55/462, 484, 486, 522, 524, 527, 520, 55/DIG. 25
  See application file for complete search history.

(56) References Cited

U.S. PATENT DOCUMENTS 1,808,170 A 6/1931 Kamrath
2,035,758 A * 3/1936 Pierce .................... B01D 29/15
166/230

(Continued)

FOREIGN PATENT DOCUMENTS

CH 340483 A 8/1959
JP 2001-011548 A 1/2001

(Continued)

OTHER PUBLICATIONS

International Search Report and Written Opinion for International Application No. PCT/US2010/02356 dated Nov. 8, 2010.

(Continued)

*Primary Examiner* — Frank Lawrence
(74) *Attorney, Agent, or Firm* — Sutherland Asbill & Brennan LLP

(57) ABSTRACT

A method and apparatus are provided for separating droplets of finely aerosolized elemental mercury from a fluid stream in which the droplets are dispersed, particularly a gaseous stream. In the method, a precious metal wire capillary surface or precious metal-coated wire capillary surface is contacted with the gaseous stream, causing the aerosolized droplets to deposit on the capillary surface and by capillary action to coalesce with other of such droplets. The surface is oriented to allow the mercury to flow by gravitational forces and capillary action to the lowermost portions of the surface, where it accumulates and can be collected. Metallic capillary surfaces comprised of finely braided strands of silver, gold, palladium, platinum, or rhodium wire, or wire coated with one or more of these metals, are particularly preferred.

26 Claims, 9 Drawing Sheets

Related U.S. Application Data 27, 2010, now Pat. No. 8,828,731, which is a continuation-in-part of application No. 12/459,389, filed on Jun. 30, 2009, now Pat. No. 8,105,423, which is a continuation-in-part of application No. 12/001,057, filed on Dec. 7, 2007, now Pat. No. 7,981,298.

(60) Provisional application No. 61/275,349, filed on Aug. 28, 2009, provisional application No. 60/874,915, filed on Dec. 14, 2006.

(51) Int. Cl.
*B01D 46/00* (2006.01)
*B01D 39/12* (2006.01)
*B01D 39/08* (2006.01)
*B01D 46/24* (2006.01)

(56) References Cited

U.S. PATENT DOCUMENTS

| | | |
|---|---|---|
| 2,107,945 A | 2/1938 | Hull et al. |
| 3,627,191 A | 12/1971 | Hood |
| 3,786,619 A | 1/1974 | Melkersson et al. |
| 4,050,237 A | 9/1977 | Pall et al. |
| 4,154,704 A | 5/1979 | Vinton et al. |
| 4,160,684 A | 7/1979 | Berger, Jr. et al. |
| 4,233,274 A | 11/1980 | Allgulin |
| 4,416,408 A | 11/1983 | Spirig |
| 4,443,341 A | 4/1984 | Miller et al. |
| 4,705,543 A | 11/1987 | Kertzman |
| 4,925,463 A | 5/1990 | Kuhnert |
| 5,080,799 A | 1/1992 | Yan |
| 5,292,412 A | 3/1994 | Pitton |
| 5,322,628 A | 6/1994 | Yan |
| 5,391,217 A | 2/1995 | Zoche |
| 5,409,522 A | 4/1995 | Durham et al. |
| 5,437,793 A | 8/1995 | Alper |
| 5,698,139 A | 12/1997 | Alper |
| 5,733,786 A | 3/1998 | Green |
| 5,837,146 A | 11/1998 | Alper |
| 5,961,823 A | 10/1999 | Alper |
| 5,972,216 A | 10/1999 | Acernese et al. |
| 6,117,333 A | 9/2000 | Frankiewicz et al. |
| 6,180,010 B1 | 1/2001 | Alper |
| 6,200,816 B1 | 3/2001 | Farber et al. |
| 6,268,543 B1 | 7/2001 | Sakai et al. |
| 6,475,802 B2 | 11/2002 | Schaedlich et al. |
| 6,805,727 B2 | 10/2004 | Alper |
| 6,811,588 B2 | 11/2004 | Niakin |
| 6,861,002 B2 | 3/2005 | Hughes |
| 6,958,136 B2 | 10/2005 | Chandran et al. |
| 7,041,222 B1 | 5/2006 | Rainer |
| 7,211,707 B2 | 5/2007 | Axtell et al. |
| 7,264,721 B2 | 9/2007 | Alper |
| 7,264,722 B2 | 9/2007 | Alper |
| 7,309,429 B2 | 12/2007 | Patil et al. |
| 7,314,507 B1 | 1/2008 | Ganesan |
| 7,476,365 B2 | 1/2009 | Al-Faqeer |
| 7,708,794 B2 | 5/2010 | Dullien et al. |
| 7,981,298 B2 | 7/2011 | Alper |
| 8,062,517 B2 | 11/2011 | Alper |
| 8,105,423 B2 | 1/2012 | Alper |
| 2002/0027105 A1 | 3/2002 | Alper |
| 2003/0228699 A1 | 12/2003 | Shade et al. |
| 2005/0207955 A1 | 9/2005 | Wang |
| 2006/0011551 A1 | 1/2006 | Alper |
| 2006/0021506 A1 | 2/2006 | Hakka et al. |
| 2007/0092418 A1 | 4/2007 | Mauldin et al. |
| 2007/0289447 A1 | 12/2007 | Yang et al. |
| 2008/0011683 A1 | 1/2008 | Dong et al. |
| 2008/0081376 A1 | 4/2008 | Hernandez et al. |
| 2008/0210635 A1 | 9/2008 | Alper |
| 2009/0029447 A1 | 1/2009 | Squire |
| 2009/0032472 A1 | 2/2009 | Krogue et al. |
| 2009/0101015 A1 | 4/2009 | Hua |
| 2009/0145343 A1 | 6/2009 | Mauldin |
| 2010/0000409 A1 | 1/2010 | Alper |
| 2012/0184039 A1 | 7/2012 | Alper |

FOREIGN PATENT DOCUMENTS

| | | |
|---|---|---|
| WO | 2008/076314 A2 | 6/2008 |
| WO | 2011/002493 A1 | 1/2011 |
| WO | 2011/046581 A1 | 4/2011 |

OTHER PUBLICATIONS

International Preliminary Report on Patentability for International Application No. PCT/US2010/002356 issued Feb. 28, 2012.
International Search Report and Written Opinion for International Application No. PCT/US2010/001824 mailed Aug. 23, 2010.
International Preliminary Report on Patentability for International Application No. PCT/US2010/001824 issued Jan. 4, 2012.
International Search Report and Written Opinion for International Application No. PCT/US2007/025514 mailed Apr. 17, 2008.
International Preliminary Report on Patentability for International Application No. PCT/US2007/025514 issued Jun. 16, 2009.
Official Action of the European Patent Office for Application No. 10794482.9 dated Jul. 12, 2013.
Patent Examination Report No. 1 for Australian Patent Application No. 2010266695 issued Aug. 3, 2013.
Supplementary European Search Report for EP10794482 mailed Nov. 19, 2012.
PCT International Search Report and Written Opinion for International Application No. PCT/US2015/047693 mailed Nov. 19, 2015.
"Method 1664, Revision B: n-Hexane Extractable Material (HEM; Oil and Grease) and Silica Gel Treated n-Hexane Extractable Material (SGT-HEM; Non-polar Material) by Extraction and Gravimetry," Feb. 1, 2010, pp. 1-35, XP055172066, Retrieved from the Internet: URL:http://water.epa.gov/scitech/methods/cwa/upload/Method-1664- Revision-B-n-Hexane-Extractable-Material-HEM-Oil-and-Grease-and-Silica-Gel-Treated-n-Hexane-Extractable-Material-SGT-HEM-Non-polar-Material-by-Extraction-and-Gravimetry.pdf [retrieved on Feb. 25, 2015].
Supplementary European Search Report for application No. EP 10823718 dated Feb. 26, 2015, The Hague.

\* cited by examiner

PROCESS AND SYSTEM FOR SEPARATING FINELY AEROSOLIZED ELEMENTAL MERCURY FROM GASEOUS STREAMS

CROSS REFERENCE TO RELATED APPLICATIONS

This application is a continuation-in-part of U.S. patent application Ser. No. 13/392,357, filed Apr. 6, 2012, now U.S. Pat. No. 8,828,731, which is a U.S. national stage application of International Application No. PCT/US2010/002356, filed Aug. 27, 2010, which claims priority to U.S. provisional patent application No. 61/275,349 filed on Aug. 28, 2009, and International Application No. PCT/US2010/002356 is also a continuation-in-part of U.S. patent application Ser. No. 12/459,389, now U.S. Pat. No. 8,105,423, filed Jun. 30, 2009, which is a continuation-in-part of U.S. patent application Ser. No. 12/001,057, now U.S. Pat. No. 7,981,298, filed Dec. 7, 2007, which claims priority from U.S. Provisional Appl. Ser. No. 60/874,915, filed Dec. 14, 2006, each of which is incorporated herein by reference in their entireties.

TECHNICAL FIELD OF THE INVENTION

This invention relates generally to methods and apparatus for removing pernicious contaminants from fluid, particularly gaseous, systems to preclude discharge of the contaminants into the surrounding environment, and more specifically relates to methods and devices for removing from a gaseous stream elemental mercury which is dispersed therein as a fine aerosol.

BACKGROUND OF INVENTION

In the course of practicing a wide variety of commercially important industrial processes, gaseous process streams (or more generally "gaseous systems") are produced which are contaminated with pernicious quantities of mercury. The mercury contaminants have proved to be particularly difficult to remove or reduce to acceptable levels. One of the most harmful forms of mercury pollution is finely aerosolized elemental mercury. This form of mercury is generated by coal-fired power plants and also is present in natural gas. In the U.S. coal-fired power plants are the largest source of man-made mercury emissions to the air, accounting for approximately 40% of all mercury emissions. Under current circumstances, mercury is adsorbed on the aerosolized soot from coal burning. This soot eventually settles and the mercury adsorbed on the carbon is converted to methyl mercury, dimethyl mercury, and other forms, which accumulate in the food chain. Alternatively, techniques have been developed which will cause the carbonaceous soot to auto-ignite and convert to $CO_2$ and $H_2O$. When this occurs, finely aerosolized elemental mercury is produced. The mechanism for conversion of elemental mercury to methyl mercury and other forms is not well understood but is most certainly microbially mediated. It is estimated that 2000 tons of mercury is generated this way annually. Elemental mercury also occurs in natural gas in concentrations up to hundreds of micrograms per $Nm^3$. This is a significant account considering that a typical plant will process millions of $Nm^3$ per day.

Currently there is no technology that is considered optimal for remediation of the mercury in its elemental aerosolized form. Although coalescers, brominated adsorbents, and other methods have been used, they either lack effectiveness or have significant negative aspects such as generation of large amounts of mercury-polluted material to be land-filled. Coalescers lack effectiveness due to the extremely small size and high surface tension of the droplets and also due to the lack of affinity for mercury of typical coalescer materials. Also known is a process based on photochemical oxidation. This has chiefly been known for use in treating flue gas wherein ultraviolet (UV) light is introduced into the flue gas, to convert elemental mercury to an oxidized form (i.e. mercuric oxide, mercurous sulfate, and mercurous chloride). Once in the oxidized form, mercury can be collected in existing air pollution control devices such as wet $SO_2$ scrubbers, electrostatic precipitators, and baghouses (fabric filters).

None of the foregoing techniques, however, have been fully successful in treating gaseous systems of the type with which the present invention is concerned. In addition to human and ecological effects, mercury in this elemental finely aerosolized form compromises the integrity of the steel and iron in the plants and pipeline for processing and transporting the gas, sometimes resulting in catastrophic failure and explosions or uncontrolled releases. It would be most desirable to capture and coalesce the droplets of mercury and to remove the mercury from these gaseous streams in its pure and elemental form, thus eliminating release and/or production of great quantities of mercury-polluted adsorbent.

The aforementioned problems in treating gaseous streams are also issues in aqueous or gaseous process streams (or more generally "fluid streams") which are produced in many other commercially important industrial processes, these streams being contaminated with pernicious quantities of mercury in various oxidation and complexation states and including elemental, ionic, and organically-bound mercury. Mercury is corrosive to metals and other materials within a facility where the process is practiced, and is harmful to human health and to the surrounding ecosystem. Mercury contaminants have proved to be particularly difficult to remove or reduce to acceptable levels. In order to do so, it is important to know the concentration and speciation (organically-bound, ionic, or elemental) of mercury (Hg) in the stream containing same.

The parent application to the present disclosure, U.S. patent application Ser. No. 13/392,357, discloses methods and apparatus for analyzing the concentrations of diverse contaminating mercury species present in a fluid stream, whether aqueous or gaseous, in order that an effective strategy for separating the mercury from the stream may then be formulated. Characterization of the particular mercury (Hg) species in a waste stream is important in designing remediation technology, as the three primary forms of mercury (ionic, organically-bound, and elemental) possess very different physical and chemical properties. However, up to now, the ability to characterize mercuric species has been limited and difficult. Mercury is usually present in very low concentrations (usually 1 ppm or less) and there are usually large fluctuations in influent mercury concentration; rendering inaccurate spot sampling. The composition of speciation changes when these small amounts of mercury come in contact with the sample vessel. Further, standard tests are destructive and do not differentiate adequately between the three forms. The parent application U.S. patent application Ser. No. 13/392,357 disclosed a multi-stage filtration method and system to address the problems in prior systems.

SUMMARY OF INVENTION

The problem associated with capturing finely aerosolized elemental mercury is primarily one of overcoming the surface tension of the aerosolized droplet in order to allow the liquid mercury to wet out on a surface. Secondarily, the coalesced mercury must be prevented from re-aerosolizing off the substrate. One way to achieve this is by exploiting the contact angle of the droplet with a given interface.

Now in accordance with the present invention, a method (and apparatus for practicing the method) are provided for separating droplets of finely aerosolized elemental mercury from a gaseous stream in which the droplets are dispersed. In the method a metallic capillary surface is contacted with the gaseous stream, causing the aerosolized droplets to deposit on the capillary surface and by capillary action to coalesce with other of such droplets to form increasingly large drops of mercury. The surface is oriented to allow the mercury drops to flow by gravitational forces and capillary action to the lowermost portions of the surface or an extension of same where they accumulate, and are then collected at a suitable vessel or the like, e.g. by simply dropping into the vessel.

The present invention exploits the above phenomena by employing a capillary surface-bearing substrate, preferably comprised of finely braided strands of metal wire (e.g. approximately 40-gauge, 3 mil diameter, 192 wires/strand) which is comprised of a precious metal or a combination of precious metals. By way of example, the precious metal wire can be silver, gold, ruthenium, osmium, rhodium, iridium, palladium, platinum, or combinations of these metals, and the use of the term "precious metal wire" includes combinations thereof, unless otherwise specified. Combinations of these metals can include alloys, mixtures, metal solutions, and the like, of two or more of these metals if that combination is suitable for preparing the finely braided wire. In one aspect, silver wire works very well to form the finely braided strands, and various combinations of silver with the other precious metals also work well in this regard. Gold wire also works very well to form the finely braided strands, as do combinations of gold with the other precious metals. Various combinations of the other precious metals that are suitable for preparing finely braided wire can also be used according to this disclosure. These metal wires are found to provide highly stable structures and braids, which resist deterioration from the thermal cycling imposed by typical environments in which the invention is employed.

The present invention also may exploit the above phenomena by employing a capillary surface-bearing substrate, preferably comprised of finely braided strands of a metal wire, for example, copper wire (e.g. approximately 40-gauge, 3 mil diameter, 192 wires/strand) which has an integral surface deposition of a precious metal. The braided strands of a metal wire can be made of a non-precious metal that is suitable for braiding, has properties that permit its use for fabricating the filtration system disclosed herein, and can be a non-precious metal or a precious metal. Copper wire works very well in this role. The precious metal that is coated or deposited on the surface of the braided strands of a metal wire can be any precious metal or a combination of precious metals, where combinations can include alloys, mixtures, metal solutions, and the like, of two or more of these metals if that combination is suitable for coating onto another metal wire that is, or can be made into, a finely braided wire. For example, silver-coated copper wire has been found to be particularly useful, and gold-coated copper wire also works well in this regard, as do various combinations of these metals with other precious metals. Various combinations of the other precious metals that are suitable for coating onto another metal wire that is, or can be made into, a finely braided wire also can be used according to this disclosure.

The disclosed method and filtration system can be used as a stand-alone system for removing finely aerosolized mercury, or alternatively, can be used as one of the filtration states of the multi-stage filtration system for mercury characterization and capture, as provided in the parent U.S. patent application Ser. No. 13/392,357. Specifically, the present method and system can be used as the second stage of the filtration system composed of three distinct filtration stages, with each stage having a specific affinity for each of the three predominant forms of mercury. The first stage is composed of filtration devices, which visco-elastically coagulate and incorporate substantially all organically bound forms of Hg. The second stage is a filter constructed with precious-metal-plated solder wick as the elemental Hg collection media. The finely braided wires in these filters are able to intercept and capture elemental dispersed minute particles of mercury from the fluid stream passed therethrough. The third stage is composed of a granular media adapted to collect the ionic mercury. In this context the term "ionic mercury" refers not only to such ions as may be present in an aqueous stream, but essentially means or is synonymous with inorganic mercury salts. Such salts may be present in the gaseous stream where they are hydrated by water vapor in the gases. In the case of a gaseous stream, the collecting media can simply comprise a granular activated carbon. In the instance of an aqueous stream, the media can comprise one impregnated with one or more chemical agents that are able to precipitate the ionic mercury. The granular media can in this latter instance be composed of carbon, clay, paper, perlite, etc., and the precipitating agents can include, but are not limited to, calcium sulfate, sulfides and thiols and the like. In this aspect, the U.S. patent application Ser. No. 13/392,357 is incorporated herein by reference in its entirety and discloses the aspects and features of how the present metallic capillary surface can be used in stage 2 of the disclosed system to cause droplets of mercury to deposit and by capillary action and coalesce, wherein the present metallic capillary surface is comprised of finely braided strands of a precious metal wire or finely braided strands of a precious metal-coated wire according to this disclosure.

The braided materials used in the disclosure are of a type that has been well known in the prior art as "solder wicks" because of their use to remove a solder connection. Such solder wicks are made of metal strands braided to form narrow interstices between the individual strands and to thereby provide a capillary surface at the wick's exterior. To form the wick the fine metal strands are typically braided together in the form of a tube, which is then flattened to make a braided ribbon. In a braided ribbon, the strands all extend in the longitudinal direction along the tube. The individual strands are in rather close engagement, yielding a ribbon with a limited volume between strands within which solder may be drawn. In one type of solder operation, the wick is placed on the solder connection and the connection is heated through the wick with a soldering iron. The solder melts and is drawn up onto the wick by capillary forces. Such solder wicks are generally made of copper wire.

In U.S. Pat. No. 3,627,191 further details of such a solder wick are discussed, such as that the wick disclosed therein comprises a braid of strands of 40-gauge copper wire and the strands are in groups of four. The wick is braided from a machine having 16 heads so that the wick is 64 strands thick with 23 tucks 27 per inch. Other grades of wire and braiding patterns can also be used, e.g., 96 strands of 44 gauge can be braided in 16 groups of six strands, etc. Solder wicks have also been proposed for production by other than braiding. For example, U.S. Pat. No. 4,416,408 mentions the use of an open-mesh structure prepared by "weaving, stranding, braiding, knitting or crochetting", the preferred process therein involving the use of a knitting machine, which results in the aforementioned lower wire diameter limit of 0.1 mm. Regardless, the fundamental requirement is that the wick have a capillary surface capable of wicking the molten solder, and braided wicks have been found most suitable for this function. Although various open mesh structures such as discussed above are useable in the present invention if they possess an adequate capillary surface, the braided wicks are the preferred material for use in the present invention, In the present invention, the preferred braided wire is formed of silver wire or silver coated copper wire. The flattened ribbon-shaped wick can be wrapped around a filter or a metal core in the preferred form of a tube, with the wire strands all extending in the longitudinal direction along the tube, and the ribbon being in one or multiple layers so as to achieve the desired degree of filtration efficiency. The metal tube has porous walls, e.g. by being perforated, and the braid, despite the contact made by the mercury droplets with the capillary surface, is relatively pervious to flow of a gas stream through them so that the gas stream in which the mercury droplets are aerosolized can be flowed from the tube to the braid or from the braid to the tube, to enable contacting of the silver or silver-plated metallic capillary surface with the aerosolized mercury droplets. Such contact causes the droplets to deposit on the capillary surface and by capillary action to coalesce with other of said droplets to form increasingly large drops of mercury. When wound in this way around a core, high removal efficiency of aerosol mercury is achieved at very low differential pressures as the gas stream passes through the wound core. For a three-layer thickness of braid around a steel core, differential pressure is only between 1 to 3 psi at a gas flow rate of 600 million ft$^3$ per day. The braided structure of the substrate results in interstitial areas of extreme contact angle (less than 45 degrees), which is able to entrap the aerosol droplets. The combination of this contact angle (hereinafter defined), along with the affinity of gold for mercury results in the de-aerosolization of the droplets and wetting out on the substrate. Silver wire and silver-plated wire also work very well in this way. When sufficient mercury has accumulated, so as to act like a bulk phase material, the surface tension of the liquid mercury will cause it to capillary flow along the axis of winding of the braid. This effect is exploited in combination with gravity to cause the captured liquid mercury to capillary down the filter and along a braided extension to a recovery point.

In an apparatus based on the foregoing method, a filtration system is provided for separating droplets of finely aerosolized elemental mercury from a gaseous stream in which the droplets are dispersed. The apparatus includes a metallic capillary surface and means for contacting metallic capillary surface with the gaseous stream, causing the droplets to deposit on the surface and by capillary action to coalesce with other of the droplets to form increasingly large drops of mercury. The said capillary surface is oriented to allow the mercury drops to flow by gravitational forces and capillary action to the lowermost portion of the surface where it accumulates; and means are provided for collecting the accumulating mercury thereby separated from the gas stream. The capillary surface is preferably defined at the surface of a wick made of braided copper strands; and the strands are preferably silver, silver-plated, gold, or gold-plated. Combinations of the precious metals, particularly combinations of silver and/or gold with the other precious metals (ruthenium, osmium, rhodium, iridium, palladium, and platinum, which are the "platinum metals") can also be used to good advantage.

In a further aspect of the apparatus of the invention, a filtration system is provided for separating droplets of finely aerosolized elemental mercury from a gaseous stream in which the droplets are dispersed. The system includes a generally enclosed tank having an inlet for receiving the gaseous stream and an outlet for discharging the gaseous stream after the mercury has been removed. One or more filters are positioned in the tank, which filters include a perforated wall tube wound with a substrate formed from a wick made of metal strands braided to form narrow interstices between the individual strands which thereby provide a capillary surface at the wick's exterior. Means are provided for flowing the gas stream entered into the tank through the perforated wall of the tube and the wound substrate to effect contact of the metallic capillary surface of the substrate with the gaseous stream, causing the droplets to deposit on the capillary surface and by capillary action to coalesce with other of said droplets to form increasingly large drops of mercury. Means are provided for passing the gas stream having contacted the capillary surface to the gas discharge outlet. The tube and capillary surface are oriented to allow the mercury drops to flow by gravitational forces and capillary action to the gravitationally lowermost portion of said surface where the mercury accumulates; and means are provided in the system for receiving and collecting the accumulating mercury thereby separated from the gas stream.

Since depending on its source, the gas stream treated by the invention may include undesirable hydrocarbons and oily organic compounds organic compounds dispersed as minute aerosolized particles or mists in the gaseous media, systems and methods based on the invention may further include means to prefilter the gaseous stream before it is contacted with the capillary surface, to remove the dispersed hydrocarbons and oily organic compounds.

BRIEF DESCRIPTION OF DRAWINGS

The invention is diagrammatically illustrated by way of example in the drawings appended hereto in which.

DESCRIPTION OF PREFERRED EMBODIMENT

Figure 1:
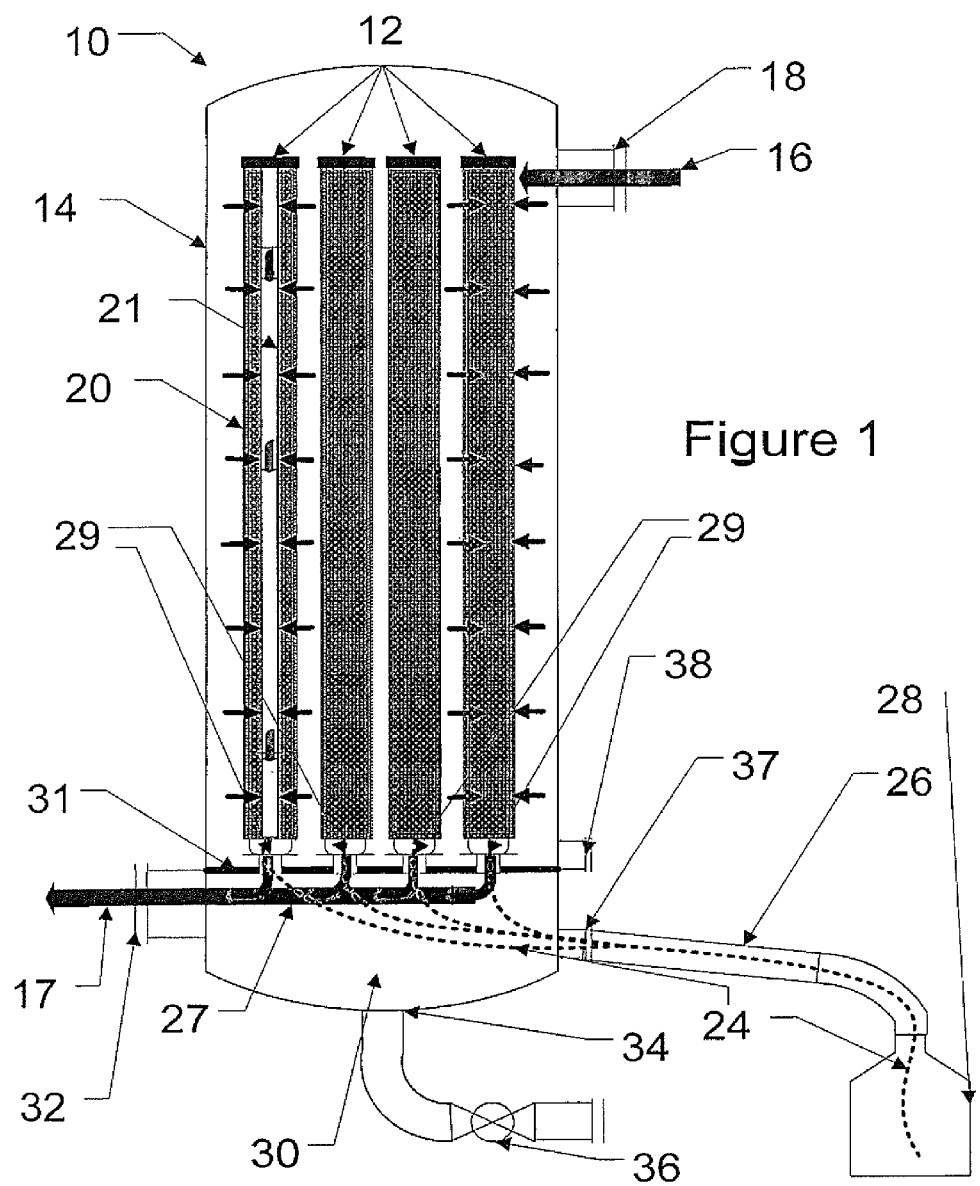
FIG. 1 is a schematic longitudinal cross-section showing a filtering system utilizing a metal capillary ("MC") filter in accordance with the invention to remove and collect finely aerosolized mercury, the depiction showing the MC filter in an outside-in gas stream flow arrangement.

As used herein, the term "precious metal" is defined according to the art-recognized technical definition provided in the *Academic Press Dictionary of Science and Technology* (ed. C. Morris, p. 1711, Academic Press, Inc.; San Diego, c. 1992), namely, precious metal means silver, gold, or any of the platinum group metals. A platinum group metal is defined according to the *Academic Press Dictionary of Science and Technology* (ed. C. Morris, p. 1670 Academic Press, Inc.; San Diego, c. 1992) as any of the six metals belonging to group VIII B of the Periodic Table, that is, ruthenium, osmium, rhodium, iridium, palladium, and platinum, which is understood by the skilled person.

This disclosure provides generally a method and a filtration system that can separate droplets of finely aerosolized elemental mercury from a gaseous stream in which the droplets are dispersed. The method and system address the limitations of the prior art by, among other things, overcoming the surface tension of the aerosolized droplet in order to allow the liquid mercury to wet out on a surface, in combination with using the contact angle of the droplet with a given interface to prevent the coalesced mercury from re-aerosolizing and re-entering the gaseous stream. The present invention exploits the above phenomena by employing a capillary surface-bearing substrate, preferably comprised of finely braided strands of a precious metal wire or a precious metal-coated wire.

Therefore, according to an aspect, there is provided a method for separating droplets of finely aerosolized elemental mercury from a gaseous stream in which the droplets are dispersed, comprising:

contacting a metallic capillary surface with said gaseous stream, causing said droplets to deposit on said surface and by capillary action to coalesce with other of said droplets to form increasingly large drops of mercury, wherein the metallic capillary surface is comprised of braided strands of metal wire, the metal wire being made of a precious metal or a combination of precious metals, or the metal wire being made of a non-precious metal which is coated with a precious metal or a combination of precious metals;

and wherein the said surface is oriented to allow the mercury drops to flow by gravitational forces and capillary action to the lowermost portion of said surface where it accumulates.

Further according to this disclosure, there is provided a filtration system for separating droplets of finely aerosolized elemental mercury from a gaseous stream in which the droplets are dispersed, comprising:

a metallic capillary surface comprised of finely braided strands of metal wire, the metal wire being made of a precious metal or a combination of precious metals, or the metal wire being made of a non-precious metal which is coated with a precious metal or a combination of precious metals;

means for contacting said metallic capillary surface with said gaseous stream, causing said mercury droplets to deposit on said surface and by capillary action to coalesce with other of said droplets to form increasingly large drops of mercury;

and wherein the said capillary surface is oriented to allow the mercury drops to flow by gravitational forces and capillary action to the lowermost portion of said surface where it accumulates; and means for collecting the accumulating mercury thereby separated from the said gas stream.

Preferably, the metallic capillary surface can be comprised of finely braided strands of silver, gold, palladium, platinum, rhodium, or a combination thereof. Also preferably, the metallic capillary surface can be comprised of finely braided strands of a wire made of a non-precious metal such as copper, that is coated with silver, gold, palladium, platinum, rhodium, or a combination thereof. Alternatively, the underlying wire can also be a different precious metal than the precious metal used in the coating. More preferably, the metallic capillary surface can be comprised of finely braided strands of silver, gold, palladium, or platinum or a combination thereof, or copper wire coated with silver, gold, palladium, or platinum, or a combination thereof. Combinations of more than one of these metals can include alloys, mixtures, metal solutions, and the like, if that combination is suitable for preparing the finely braided wire or for coating onto a finely braided wire. Particularly useful are metallic capillary surfaces comprised of finely braided strands of silver or silver-coated wire, or gold or gold-coated wire. When one or more of the precious metals are used to coat the underlying wire, the coated wire can be a precious or non-precious metal. In this regard, copper wire works very well to form the finely braided strands used in fabricating the filtration system as disclosed herein.

This disclosure describes in detail the filtration system and method used as a stand-alone system for removing finely aerosolized mercury, but also discloses the use of this filtration system as one of the filtration states of the multi-stage filtration system for mercury characterization and capture, as provide in the parent U.S. patent application Ser. No. 13/392,357. Specifically, the present precious metal braided wire and precious metal-coated braided wire can be used to fabricate the second stage of the filtration system composed of three distinct filtration stages, in which the second stage is constructed with precious metal wire or precious metal-plated wire that forms a solder wick as the elemental Hg collection media.

Referring to the schematic block diagram of FIG. 1, a filtering system 10 is shown which utilizes metal capillary ("MC") filters 12 in accordance with the invention to remove and collect finely aerosolized mercury. In system 10 four identical MC filters 12 are mounted in a tank 14 to function in parallel in treating a gas flow stream 16 provided to tank 14 via inlet 18. The actual number of MC filters 12 can be greater or smaller than the exemplary four shown. The gas flow in tank 14 enters into each of the MC filters by passing through the capillary surface presented by the metallic braid 20 which in the MC filter is wound upon a stainless steel core or tube 21, the walls of which, as seen in FIG. 4, are perforated by openings 23. The braided materials used, as discussed above, are of the type that has been well known in the prior art as "solder wicks" because of their previous use to remove solder connections. Such solder wicks are made of metal strands braided to form narrow interstices between the individual strands and to thereby provide a capillary surface at the wick's exterior. To form the wick the metal strands are typically braided together in the form of a tube, which is then flattened to make a braided ribbon 25 as seen in FIG. 4A. The wick discussed In U.S. Pat. No. 3,627,191 comprises a braid of strands of copper wire, which unlike the present braid is overcoated with flux. In this prior patent, the wire is 40-gauge and the strands are in groups of four. The wick is braided from a machine having 16 heads so that the wick is 64 strands thick with 23 tucks 27 per inch. Such a wick (minus the flux) is suitable for use in the present invention, preferably when modified by a silver or gold plating, but other grades of wire, and braiding patterns can also be used, e.g., 96 strands of 44 gauge can be braided in 16 groups of six strands, etc. The fundamental requirement is that the wick have a capillary surface capable of wicking the mercury that pursuant to the present invention is deposited on the capillary surface.

In the present invention, the preferred braided wire 20 is of copper and silver- or gold-plated and the flattened ribbon-shaped wick is wrapped around a filter or the porous wall metal tube 21 in one or multiple layers so as to achieve the desired degree of filtration efficiency. When wound in this way, high removal efficiency of aerosol mercury is achieved at very low differential pressures. For a three layer thickness of braid around a steel tube with wall perforations as in FIG. 4, differential pressure is only between 1 to 3 PSI at a gas stream flow rate of 600 million $ft^3$ per day.

FIG. 5 shows how the aerosolized mercury droplets 33 in the gas stream deposit on the capillary surface of braid 20 and then gradually coalesce and increasingly wet the said surface as they advance downwardly in the sense of the Figure, driven by capillary action and aided by gravity. FIG. 5A to the right of FIG. 5 graphically depicts the approximate change in contact angle as the collected mercury droplets coalesce and advance downwardly in FIG. 5, where the well-known parameter "contact angle" is defined here as the angle formed by the solid/liquid interface measured from the side of the liquid. Four approximate regions (a), (b), (c), and (d) are shown in FIG. 5 in the descending direction on braid 20. In FIG. 5A approximate contact angles are depicted for these four regions, The braided structure of the substrate thus results in interstitial areas of an extreme contact angle (greater than 45 degrees—as seen at region (a) at the top of FIG. 5) which is able to entrap the aerosol droplets 33. The combination of this contact angle, along with the affinity of silver or gold for mercury results in the de-aerosolization of the droplets and increasing wetting out of the substrate surface as shown by the sequence of contact angles in regions (b), (c), and (d), proceeding downwardly in FIGS. 5 and 5A. When sufficient mercury has accumulated, so as to act like a bulk phase material, the surface tension of the liquid mercury and the gravitational influence of the vertical orientation of the MC filters will cause the mercury to capillary flow along the axis of winding of the braid. This effect is exploited to cause the captured liquid mercury to capillary down the filter and along the braided extensions 24 (FIG. 1) to a recovery point, i.e. in this instance to the mercury removal reservoir 28. The enlarged view of FIG. 3 shows the several braid extensions 24 which at this point can be intertwined together, exit the tank through port 37 (FIG. 1), pass through duct 26 and enter the mercury removal reservoir 28, where the mercury is collected as it wicks down the braids and drops from the bottom ends thereof.

The gas stream 17 from which the aerosolized mercury has been removed exits the core interiors 21 of MC filters at outlets 29 into plenum 27, which is separated from the rest of tank 14 by a plate 31, which extends across the tank, and then exits tank 14 via outlet 32. Since some condensation will tend to occur in the plenum 27, the bottom of the plenum defines a sump 30 for which a drain outlet 34 and valve 36 are provided. In addition further connection ports to the tank 14, such as at 38, enable gauges or other instrumentation to be connected as desired to the tank 14 or to one or more of the MC filters 12 or portions thereof.

In FIG. 1 the depiction shows the MC filter in an outside-in flow arrangement. FIG. 2 shows the MC filters being used in inside-out flow arrangements. Thus in the filtration system 45 of FIG. 2 (where identical elements are identified by corresponding reference numerals) the stream 40 enters the plenum 27 via inlet 41 at the bottom of tank 42, and passes into MC filters 44 via the hollow axial interiors 46 of cores 21. Then after passing through the openings of the perforated walls of cores 21 the stream 40 passes to the metallic braid 20 wound upon the core 46 of each MC filter 44, where the same action occurs as discussed in connection with FIG. 1, with the depositing mercury droplets again coalescing and advancing by capillary action aided by gravity, to reach the mercury removal reservoir 28. The gas stream 47 with the mercury removed exits tank 42 via outlet 48.

While a principal concern of the present invention is the removal of finely aerosolized mercury, the gaseous streams treated by the invention in many instances may additionally include undesirable organic compounds such as hydrocarbons and various oily compounds dispersed as minute aerosolized particles or mists in the gaseous media. As taught, however, in the invention of my U.S. Pat. No. 6,805,727 the disclosure of which is hereby incorporated by reference, the compositions disclosed in my U.S. Pat. Nos. 5,437,793; 5,698,139; 5,837,146; and 5,961,823 (all of which disclosures are hereby incorporated by reference), have extremely strong affinities for the aforementioned mist contaminants and other dispersed and/or aerosol particles in air and gas streams; and that when such streams containing these contaminant particles are passed through fluid-pervious filtration media incorporating these inventive compositions, the mentioned contaminants are immobilized at the media, as a result of which concentration levels of the contaminants in the stream filtrate may be reduced to very low values, in some instances below detectable limits in a single pass.

The fluid-pervious filtration media in my U.S. Pat. No. 6,805,727 is treated with an absorption composition cured in situ at the media, the composition comprising a homogeneous thermal reaction product of an oil component selected from the group consisting of glycerides, fatty acids, alkenes, and alkynes, and a methacrylate or acrylate polymer component. Filter configurations incorporating the said may be based on various air or gas stream permeable substrates, such as shredded, spun or otherwise configured polypropylene, polyethylene or shredded or spun cellulose, or polyester cellulose which substrates are infused or otherwise treated with the absorbent compositions, which are then cured to produce the surface modified filter. Similarly the said absorbent compositions can be incorporated into or upon other filtering substrates and media, such as paper, including compressed pulp materials, particulate porous foamed plastics, fiberglass, mineral particulates such as perlite and vermiculite, and particulate, fibrous or porous ceramic media. The resulting substrate filter may be used independently to treat an air or other gas stream from which contaminating mists or other dispersed or suspended particles are to be removed, or can be used (especially for removal of mists) in conjunction with a conventional filter, as for example by being placed in front of (i.e., in series with) the conventional filter through which the air or gas stream passes.

Figure 6:
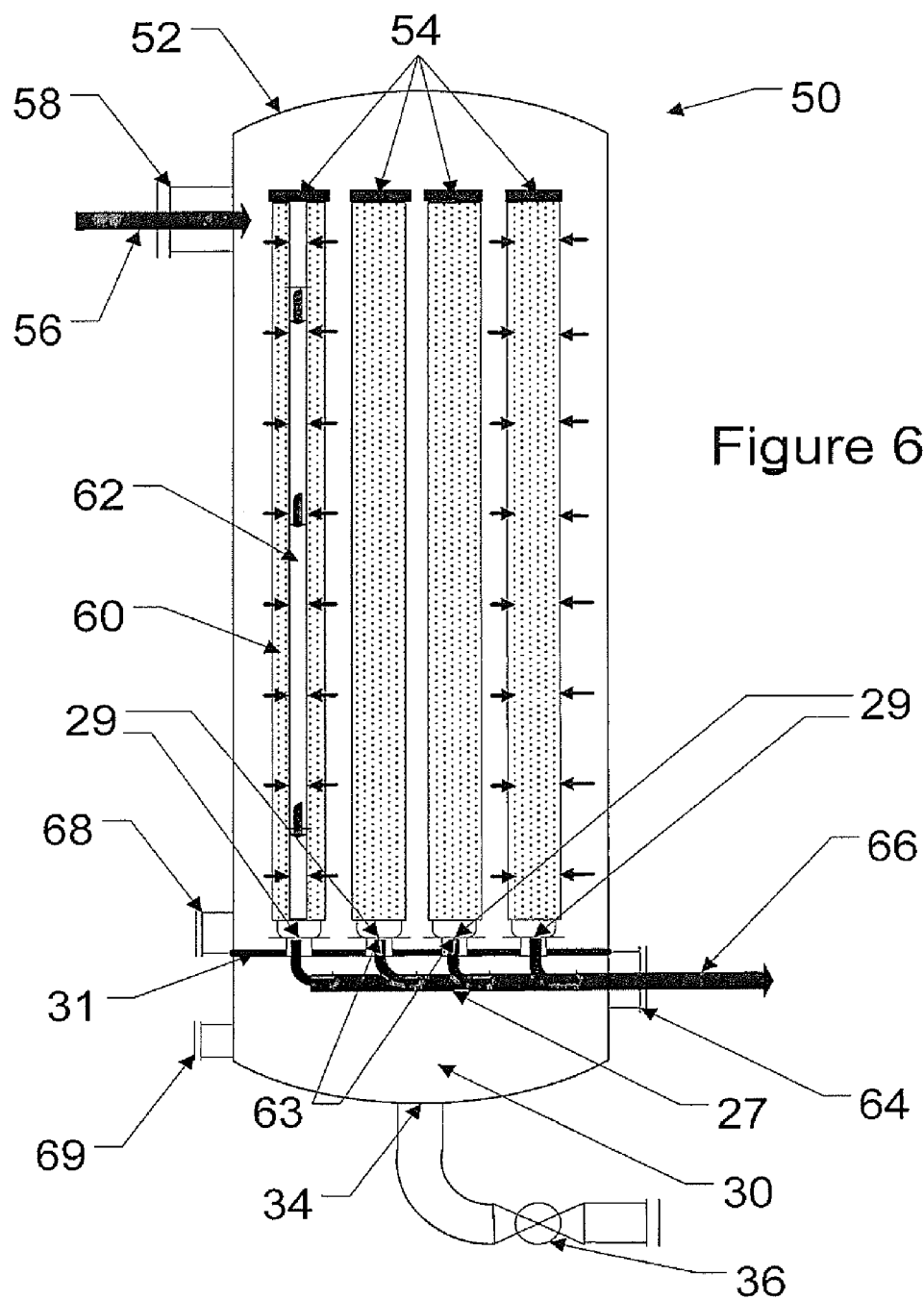
FIG. 6 is a schematic longitudinal cross-section showing an oleophilic prefilter which may be used in a gas filtering system upstream of the metal capillary ("MC") filter in order to remove organic and other contaminants that may be present in the gas flow, prior to the flow being acted upon by the MC filter or filters, the depiction showing the oleophilic prefilter in an outside-in flow arrangement.

The filters of my U.S. Pat. No. 6,805,727 accordingly can find use as a prefiltration stage, which cooperates with a downstream mercury removal filtration stage. FIG. 6 is a schematic longitudinal cross-section showing a prefiltration stage, which shall herein be referred to as an "oleophilic prefilter", which makes use of the foregoing filtration media. The oleophilic prefilter system 50, which thus may be used in a gas filtering system upstream of the metal capillary ("MC") filter in order to remove aerosolized and particulate organic and other contaminants that may be present in the gas flow prior to the flow being acted upon by the MC filter or filters, is shown in an outside-in flow arrangement. The oleophilic prefilter system 50 has an overall similarity in arrangement of its components to the devices of FIGS. 1 through 5. Thus a prefiltration tank 52 is provided in which are mounted in parallel feed fashion four oleophilic filters 54 which are arranged for outside-inside stream flow. Stream 56 enters the tank 52 through inlet 58, and then passes into each hollow core filter 54 via the oleophilic filtration media 60, which is positioned about the cores 62. This media 60 is in accord with that described in my aforementioned U.S. Pat. No. 6,805,727, and thus serves to remove the said aerosolized organics from the gas stream. The gas stream from the several in-parallel filters then exits the axial passages of cores 62 via the bottom core outlets 63 and enters the plenum 27 from which the stream 66 is discharged at outlet 64. Corresponding reference numerals, such as drain 34 and valve 36, identify additional elements in the Figure, which are functionally the same as in prior Figures. Two extra ports 68 and 69 are shown, the first connecting to the tank 52 interior above plate 31, and the second to plenum 27 below plate 31. These ports can be used with instrumentation or the like for measuring desired parameters in the spaces with which the ports communicate.

Figure 2:
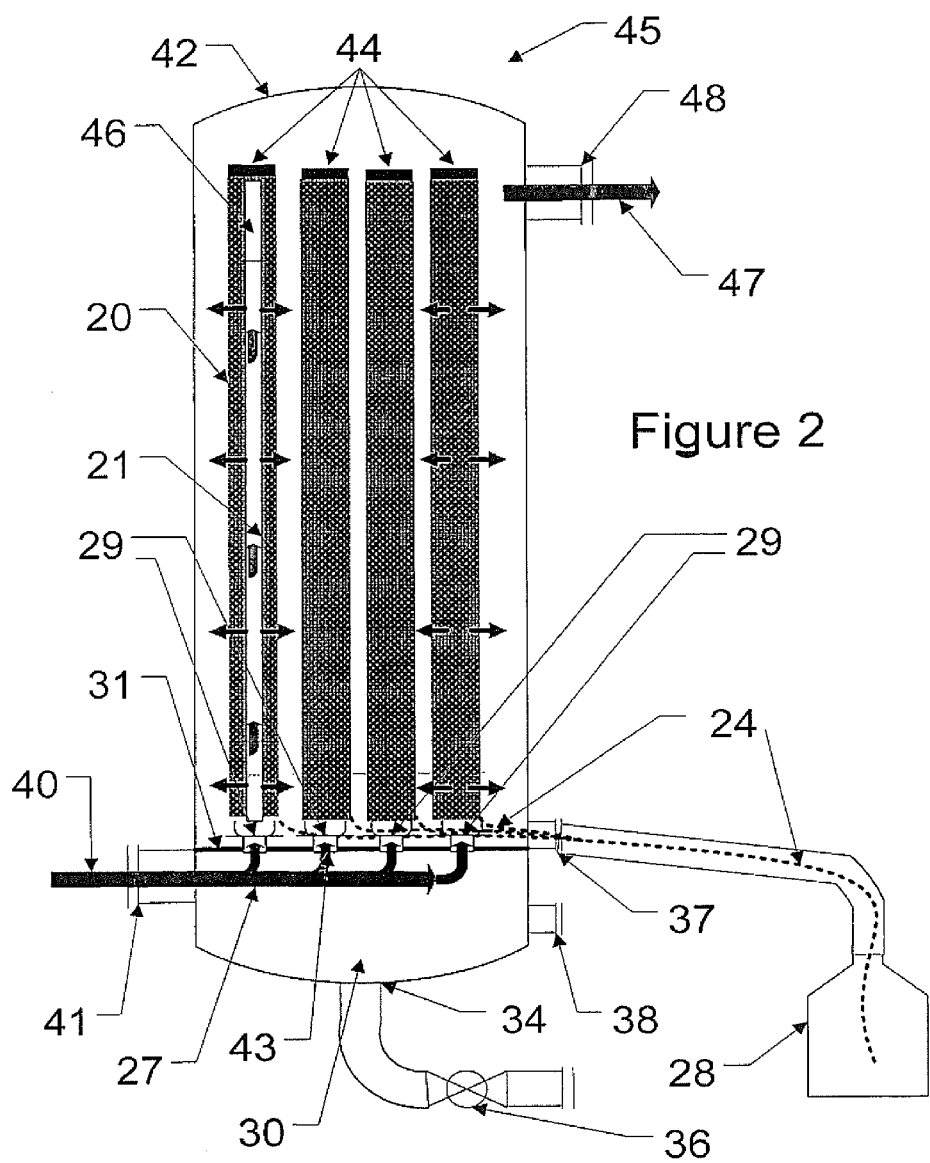
FIG. 2 is a schematic longitudinal cross-section similar to FIG. 1, except that the depiction shows the MC filter in an inside-out flow arrangement.
Figure 3:
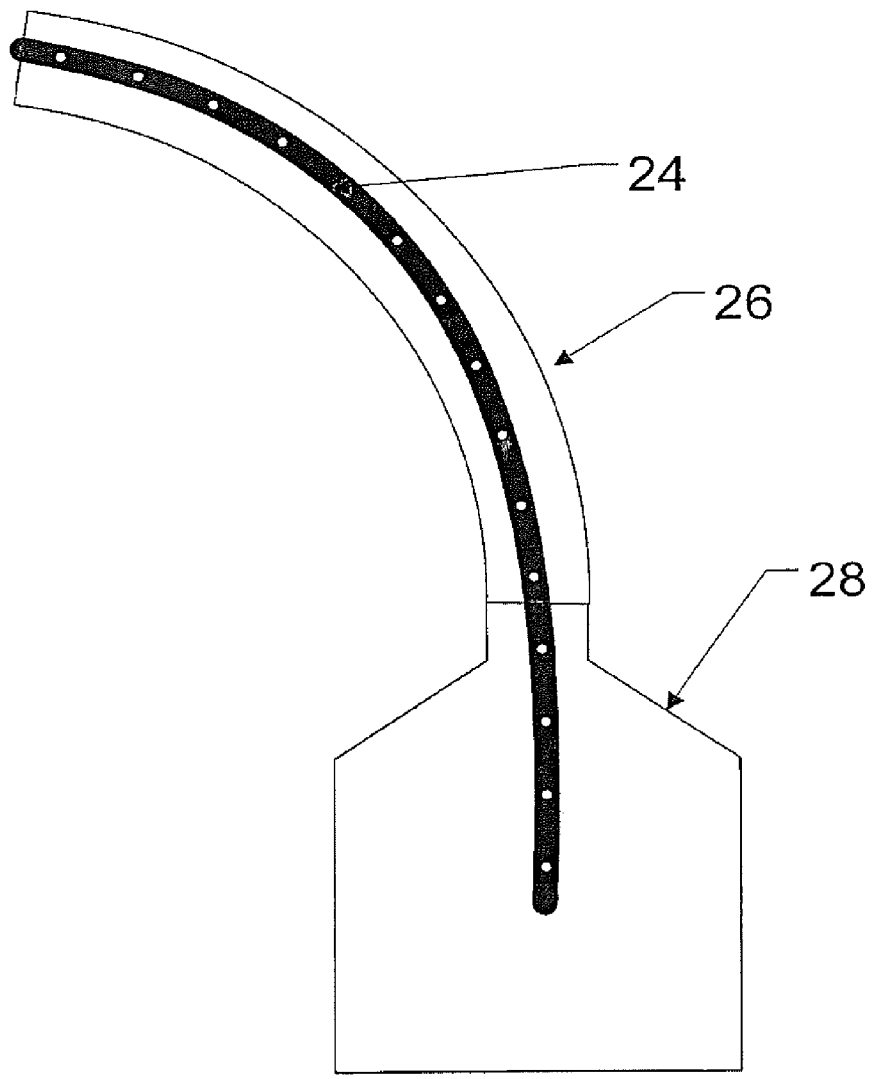
FIG. 3 is an enlarged schematic cross-section of the mercury removal reservoir of FIGS. 1 and 2, showing the lower portions of the capillary braid delivering the collected mercury to the reservoir.
Figures 4, 4A:
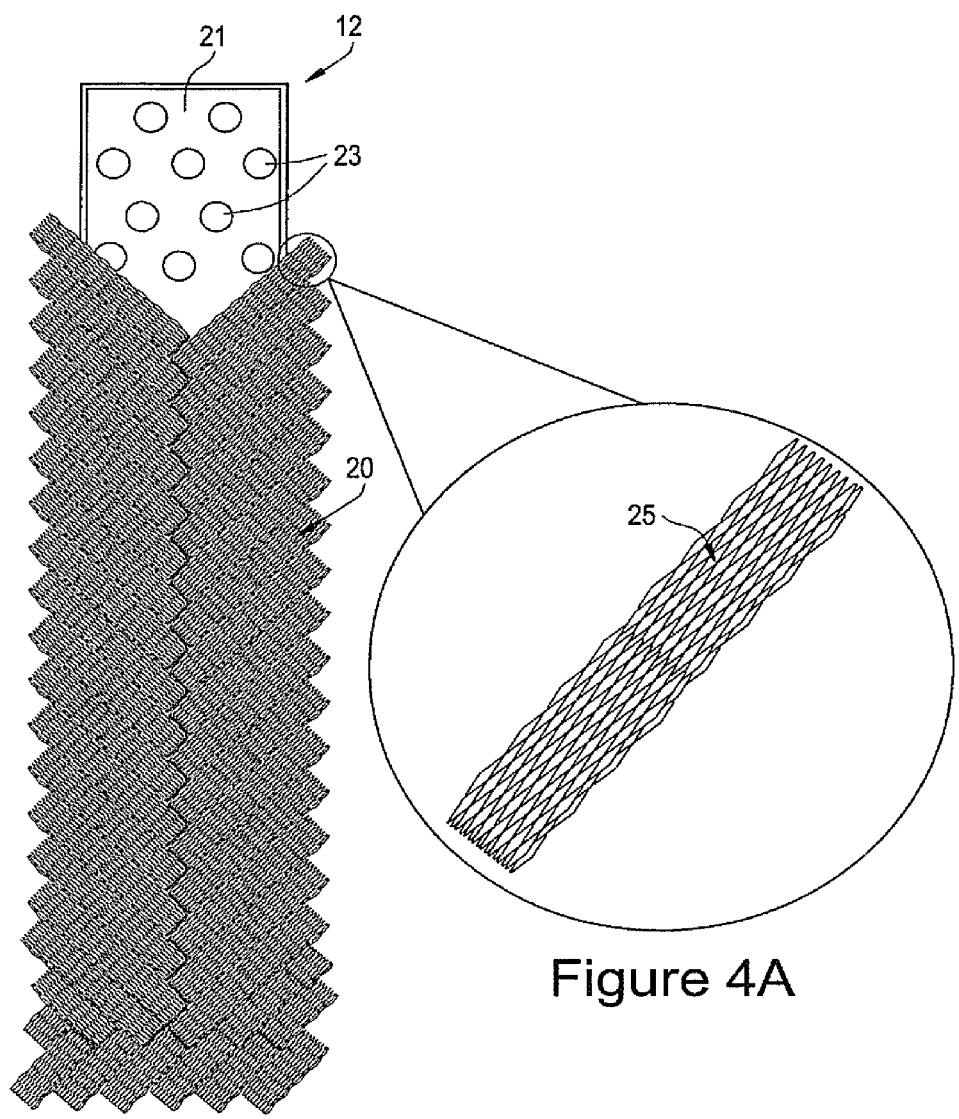
FIG. 4 is a schematic elevational view of a portion of the MC filter showing the core of the filter and portions of the braid which is wound on the core, the braided strands comprising a precious metal wire or a precious metal-coated wire which forms the metallic capillary surface.
FIG. 4A is an enlarged view of a portion of the braid in FIG. 4.
Figures 5, 5A:
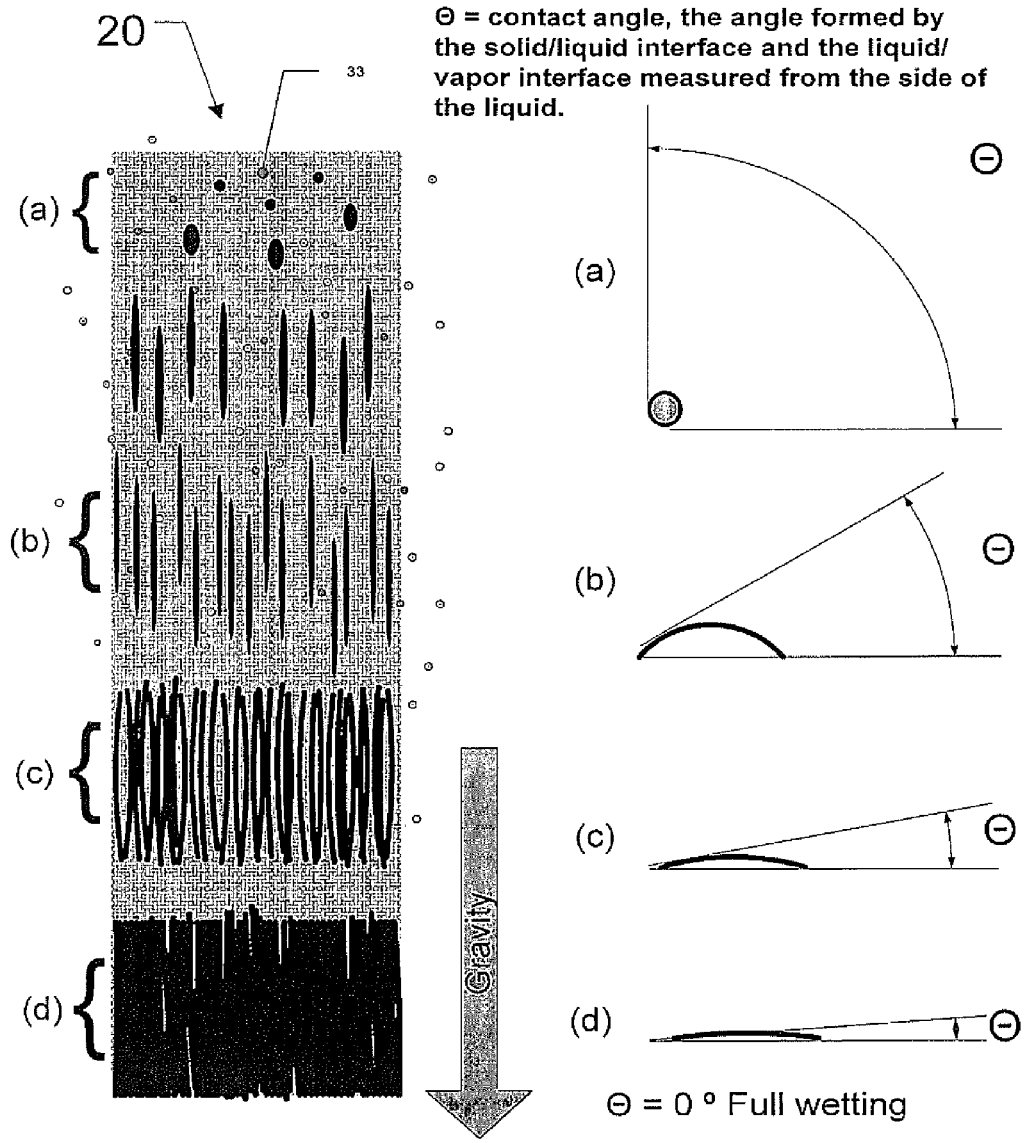
FIG. 5 is a schematic showing of the capillary surface of the braid in the MC filters of the prior Figures and together with adjacent
FIG. 5A shows the progressive change in the contact angles at the mercury-capillary surface interface as the coalescing drops proceed downwardly on the braid.
Figure 7:
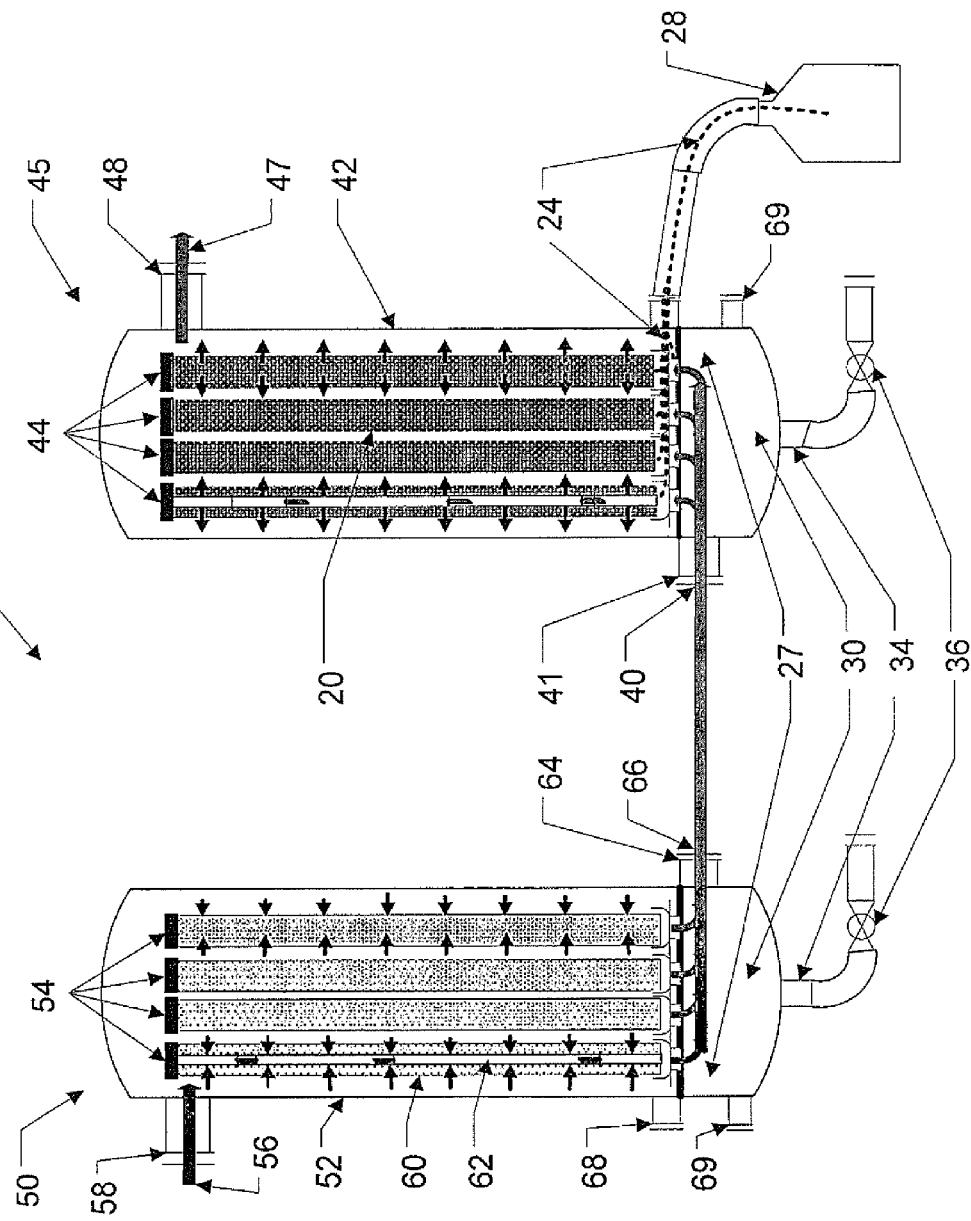
FIG. 7 is a schematic longitudinal cross-section showing a two stage mercury removal filtering system in which the first stage is an oleophilic prefilter as in FIG. 6, and the second stage is a metal capillary ("MC") filter for removing and collecting finely aerosolized mercury, the depiction showing the MC filter in an inside-out flow arrangement.

FIG. 7 is a schematic longitudinal cross-section showing a two stage mercury removal filtering system 55 in which the first stage is an oleophilic prefilter system 50 as in FIG. 6, and the second stage is an MC filter system 45 as in FIG. 2 for removing and collecting finely aerosolized mercury. Corresponding elements of the filter systems 50 and 45 are identified here by corresponding reference numerals of FIGS. 6 and 2. The output flow 66 from outlet 64 of prefilter system 50 is schematically shown entering MC filter system 45 as stream 40. The physical duct between outlet 64 and inlet 41 is not shown, but can take any convenient form such as a pipe or the like. The oleophilic filter is thus disposed upstream of the MC filter so that the former acts as a prefilter for the latter.

As has been discussed in the "Background of Invention" section herein, the present invention is inter alia applicable to remediation of various flue and exhaust gases, such as those produced in coal-fired power generation. In such instances (as well as in other environments in which exhaust gases result from combustion of high energy carbon-based fuels), mercury droplets may not be the only pernicious aerosolized droplets. Of additional concern are finely aerosolized organic compounds such as hydrocarbons in the C6 to C13 range, which encompass various diesel and gasoline components. In a further aspect of the present invention, it has been found that these aerosolized organic droplets can be coalesced with great efficacy by the use of the invention. Thus it has been found that use of a system such as that illustrated in FIG. 7 and described in the preceding paragraph, can effect coalescence of the mentioned organic droplets conjunctively with coalescence of the mercury droplets. The coalescing organics can thus be collected primarily in prefilter system 50 at the sump 30 of prefiltration tank 52, while the mercury is coalesced primarily in the mercury filtration tank 42 of the MC filter system 45, where it is then collected at an external mercury collection vessel 28. It will be further appreciated that the prefilter system 50 may also act to remove small portions of the dispersed mercury along with the various condensates that collect at sump 30. These mercury components can, if sufficient in quantities to warrant such action, be separated from the discharge at drain 34 of tank 52 by conventional chemical or physical methods. Alternatively, portions of the condensate can be converted to a vaporous form and recycled through MC filter 45 to recover such additional mercury.

Figures 8, 9:
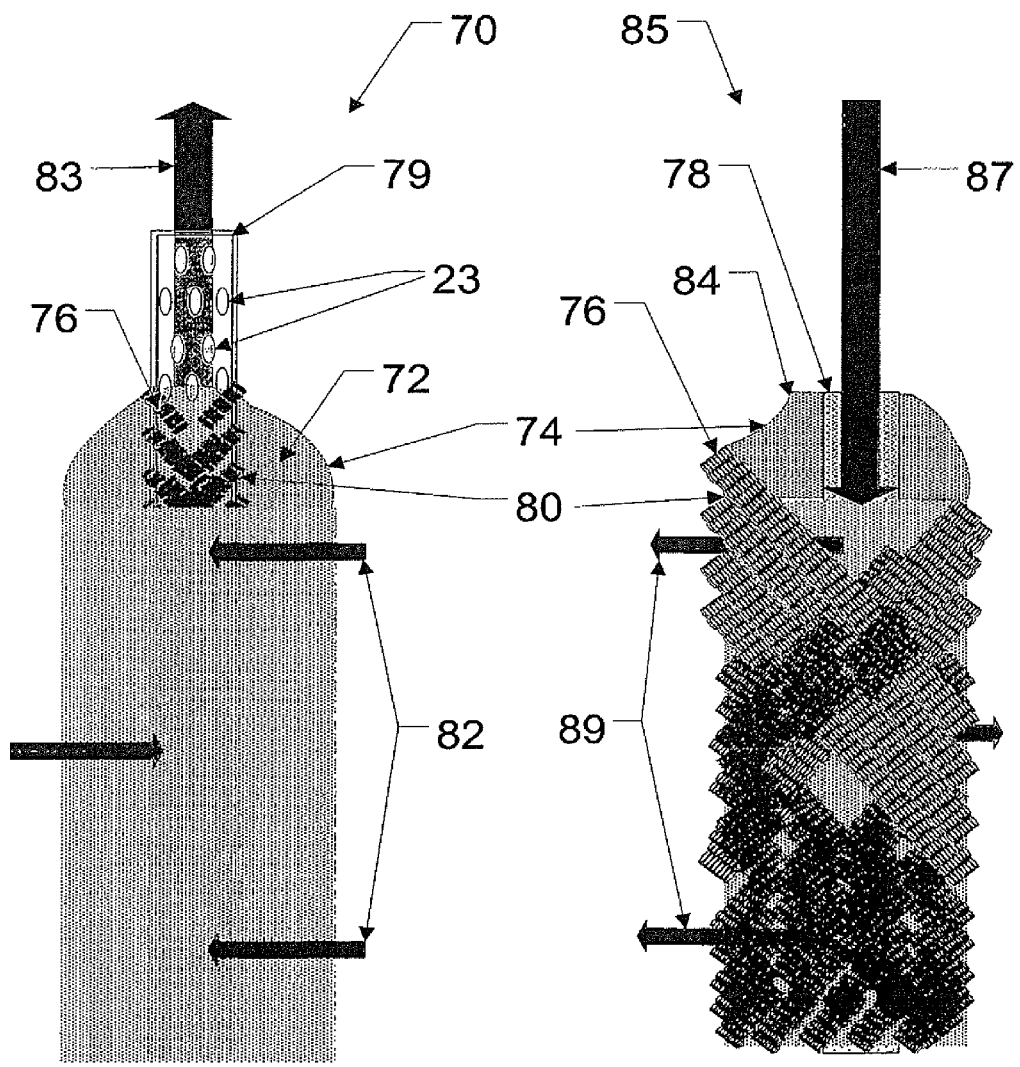
FIG. 8 is a schematic elevational view, partly sectioned, which shows a composite filter incorporating the two stages used in the FIG. 7 embodiment, the oleophilic prefilter being coaxial with but outside of the MC filter, and with the gas stream flow proceeding radially inward toward the composite filter axis.
FIG. 9 is a schematic elevational view, partly sectioned, which shows a composite filter incorporating the two stages used in the FIG. 7 embodiment, but differing from the FIG. 8 embodiment in that the oleophilic prefilter is coaxial with but inside of the MC filter, and with the gas flow proceeding outwardly from the axis of the composite filter.

FIG. 8 is a schematic elevational view, partly sectioned which shows a composite filter 70 incorporating the two stages used in the FIG. 7 embodiment, the oleophilic prefilter 72 being coaxial with but outside of the MC filter 76, and with the gas stream flow 82 proceeding radially inward toward the composite filter 70 axis. The oleophilic filtration media 74 may be wound or packed about MC filter 76 and held in place by retaining means such as string, and comprises the same materials as discussed for media 60 in FIG. 6. The MC filter 76 is formed of a perforate walled hollow core 79 of stainless steel or the like, about which the metallic braid 80 is wound. The gas stream 82 flows in the directions shown by the arrows so that the oleophilic filter stage performs its desired prefiltration function. The gas stream, then devoid of the mercury, exits as shown at 83, where it is collected, for example by the entire system 70 being mounted in a surrounding tank or the like as in prior discussed embodiments, In FIG. 9 a schematic elevational view, partly sectioned, shows a composite filter system 85 incorporating the two stages used in the FIG. 8 embodiment, but differing from the FIG. 8 embodiment in that the oleophilic prefilter 84 is coaxial with but inside of the MC filter 76, and with the gas flow 87 being introduced to and then proceeding outwardly 89 from the hollow axial portion of the perforated wall core 78. Braid 80 is therefore wound at the outside of the composite filter so that the gas stream being treated passes radially through the oleophilic prefilter 84 prior to reaching the MC filter 76, at which the mercury droplets are collected as previously described. The gas stream, then devoid of the mercury, exits as shown at 86, where it is collected, for example by the system 85 being mounted in a surrounding tank or the like, In both the embodiments of FIGS. 8 and 9 the mercury accumulating at the bottom portions of the wound braid 80 can then be collected, e.g. by the braid extending to a suitable collection point or vessel.

As noted, this disclosure also encompasses a method and means of in-situ sampling and characterization, which overcomes the above limitations. The method of the invention is practiced in a filtration system composed of three distinct filtration stages, with each stage having a specific affinity for each of the three predominant forms of mercury. The first stage is composed of filtration devices, which visco-elastically coagulate and incorporate substantially all organically bound forms of Hg. The second stage is a filter that can be constructed with a silver or silver-plated solder wick, or any precious metal or precious metal-plated solder wick, as the elemental Hg collection media. The finely braided wires in these filters are able to intercept and capture elemental dispersed minute particles of mercury from the fluid stream passed there through. The third stage is composed of a granular media adapted to collect the ionic mercury. In this context the term "ionic mercury" refers not only to such ions as may be present in an aqueous stream, but essentially means or is synonymous with inorganic mercury salts. Such salts may be present in the gaseous stream where they are hydrated by water vapor in the gases. In the case of a gaseous stream, the collecting media can simply comprise a granular activated carbon. In the instance of an aqueous stream, the media can comprise one impregnated with one or more chemical agents that are able to precipitate the ionic mercury. The granular media can in this latter instance be composed of carbon, clay, paper, perlite, etc., and the precipitating agents can include, but are not limited to, calcium sulfate, sulfides and thiols.

Figure 10:
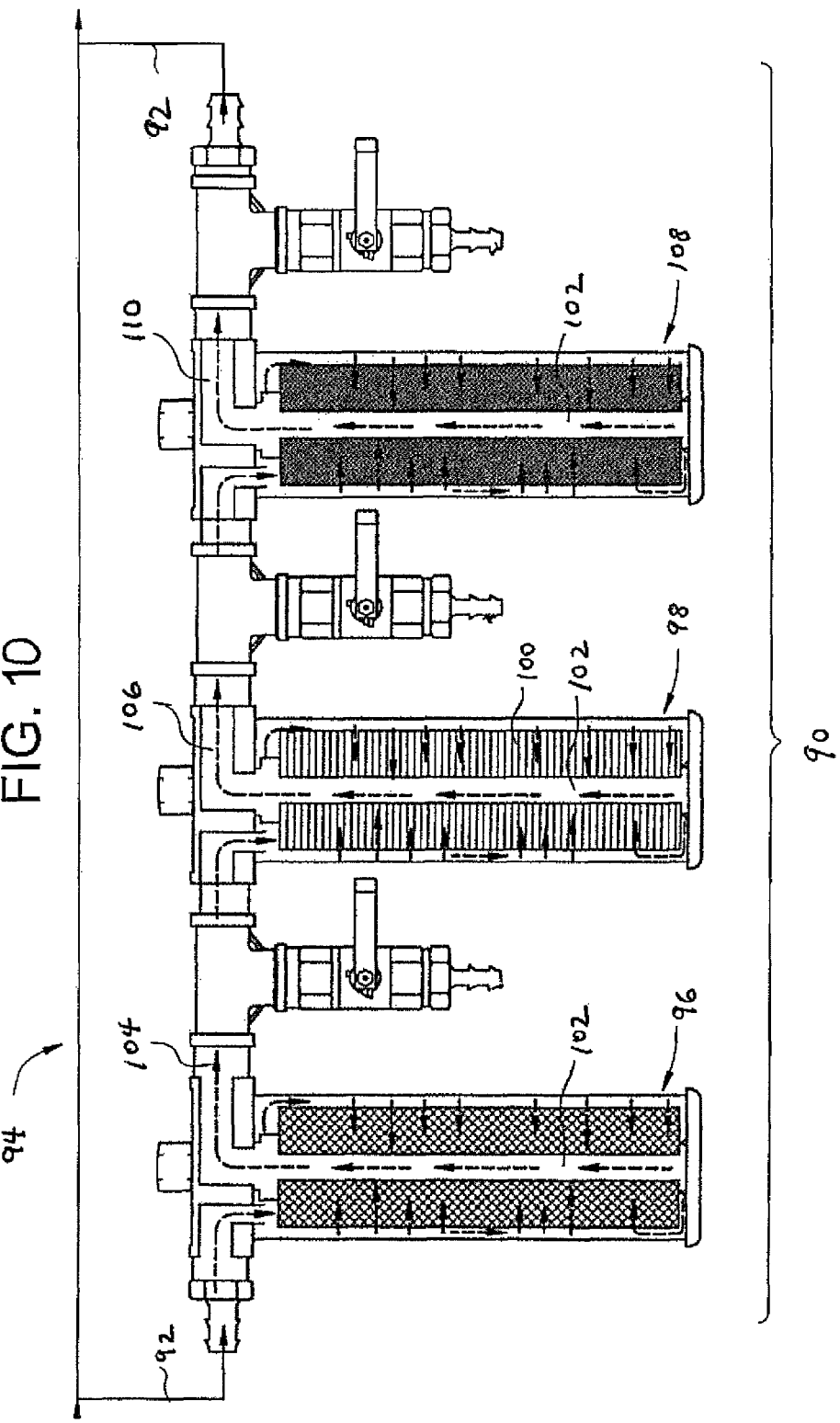
FIG. 10 is a schematic partially cross-sectioned diagram, illustrating the three-stage filtration system operating in accordance with this disclosure, in which stage two includes the metallic capillary surface is comprised of finely braided strands of a precious metal wire or finely braided strands of a precious metal-coated wire.

FIG. 10 is a schematic partially cross-sectioned diagram illustrating a system 90 operating in accordance with the present invention. For purposes of concrete illustration, system 90 will be first described on the assumption that it is operating upon an aqueous stream, such as a produced water stream as discussed above. System 90 is thus supplied by a side stream 92 (e.g. 1 to 5 gal/min) diverted from the primary stream 94 (e.g. 100s to 1000s of gal/min of produced water), and allowed to operate for a selected sampling period, depending on the influent concentrations and flow. The first filtration stage 96 preferably comprises a container within which is a fluid pervious filtration media which has been infused with an oleophilic absorption composition, whereby the removed organically bound Hg contaminants are immobilized at the media.

In accordance with the invention, the influent side stream 92 at stage 96 is thus passed through absorption composition-infused filtration media (referred to for convenience herein as an "ACI filtration media"). The flow pattern through the filter stage is shown by the arrows. The ACI filtration media preferably comprises a fluid pervious filtration media which has been infused with an absorption composition comprising a homogeneous thermal reaction product of an oil component selected from the group consisting of glycerides, fatty acids, alkenes and alkynes, and a methacrylate or acrylate polymer component, whereby the organically-bound Hg contaminants are immobilized at the media. Filtration media of this type are disclosed in detail in the present applicant's U.S. Pat. No. 6,180,010, the disclosure of which is incorporated herein by reference. The filters of the U.S. Pat. No. 6,180,010 are thus oleophilic in nature and suitable as the first filtration stage of the present invention. In that capacity they cooperate with the remaining downstream second and third mercury removal filtration stages. As set forth in that U.S. patent, the filtration media (which is infused) can comprise a non-woven polypropylene, paper, a porous ceramic, a porous metal, a mineral particulate such as vermiculite or perlite, or so forth.

At the second filtration stage 98, the above phenomena is exploited by employing a capillary surface-bearing substrate, preferably comprised of finely braided strands of copper wire (e.g. approximately 40-gauge, 3 mil diameter, 192 wires/strand) which has an integral surface deposition of a precious metal such as silver, gold, ruthenium, osmium, rhodium, iridium, palladium, platinum, or combinations thereof. Gold has an affinity for mercury, and silver is also particularly useful for this second filtration stage. Generally when gold is deposited on copper, an intermediate metal such as nickel is first plated on the copper to act as a barrier to prevent inter-metallic formation of the copper and gold. In the present invention, however, this intermetallic formation is desirable as it results in a highly stable substantially unitary structure in the strands of the braid, which resist deterioration from the thermal cycling imposed by typical environments in which the invention is employed. In contrast, were a barrier layer of nickel present between the copper and gold, peeling or undercutting of the gold surface would over time become a serious problem. One aspect of this disclosure is the use of precious metal wire such as silver wire, rather than using a plated wire, to form the braided capillary surface.

In the second filtration stage 98 of the present invention, a preferred braided wire 100 for the filter or filters is formed of copper and is preferably silver or silver-plated. The flattened ribbon-shaped wick or ribbon (e.g. FIGS. 4 and 4A) can be wrapped around a filter or a metal core in the preferred form of a tube 102, with the wire strands all extending in the longitudinal direction along the tube, and the ribbon being in one or multiple layers so as to achieve the desired degree of filtration efficiency. The metal tube 102 has porous walls, e.g. by being perforated at openings, and the braid, despite the contact made by the mercury droplets with the capillary surface, is relatively pervious to flow of the effluent stream 104 from first stage 96 through them so that the aqueous or gaseous stream in which the mercury droplets are dispersed can be flowed from the tube to the braid or from the braid to the tube, to enable contacting of the precious metal or precious metal-plated metallic capillary surface with the dispersed mercury droplets. Stream flow through second stage 98 is again shown by the arrows, and as shown is preferably from the outer walls of the container toward the center and then upwardly and out as effluent stream 106. Such contact causes the droplets to deposit on the capillary surface and by capillary action to coalesce with other of said droplets to form increasingly large drops of mercury. When wound in this way around a core, high removal efficiency of the elemental mercury is achieved at very low differential pressures as the aqueous stream passes through the wound core. The braided structure of the substrate results in interstitial areas of extreme contact angle (less than 45 degrees), which is able to entrap the droplets. The combination of this contact angle, along with the affinity mercury for the precious metal capillary surface results in the de-dispersion of the droplets and wetting out on the substrate.

The effluent stream 106 from which the elemental mercury has been removed exits the second filtration stage and proceeds to the third filtration stage 108. At the third filtration stage 108 of the is disclosure, the effluent stream 106 from the second stage 98 is passed through a filter or filters, where it is subjected to conditions, which remove the ionic mercury. In the case of an aqueous stream, this can be readily accomplished by passing the stream though a granular media impregnated with one or more chemical agents that are able to effect the desired precipitation. The granular media can be composed of carbon, clay, paper, mineral particulates such as perlite, etc., and the precipitating agents can include, but are not limited to, calcium sulfate, sulfides and thiols. These substrates may be packed or otherwise disposed in a cartridge or canister filter; or can be formed into bag filters which can be emplaced in canisters through which the contaminated water is flowed. The effluent stream 110 from third filtration stage 108 is then returned to the main or primary aqueous stream 94.

In the instance of a gaseous stream, the third stage is removed after the period of operation, and the collecting media (typically activated carbon) is subjected to chromatographic and/or spectrometric analysis. Inorganic salts of Hg with Cl, S or oxygen will behave as acids upon exposure to alkaline media such as the modified carbon resulting in formation of elemental Hg which will then be adsorbed onto the carbon substrate. In this context "ionic mercury" essentially means or is synonymous with inorganic mercury salts. Such salts may be present in the gaseous steam where they are hydrated by water vapor in the gases. Reaction products at the third filter stage 108 media will predominately be calcium chloride, sulfide, oxide or hydroxide and elemental Hg which will be adsorbed on the carbon media.

In addition, the first filtration stage is optionally removed from the filter housing after a specified time period, for total organic analysis. This is carried out by filter sectioning, hexane extraction, and running gas chromatography mass spectrometry. This is for elucidation of organic specie types and concentrations. Total Organic Concentration in the inlet stream is determined by knowing the complete mass of the filter, the mass of the section subjected to extraction, and the flow rate and time the filter was subjected to, hereby allowing the analyst to determine concentration in the stream per volume.

After the sampling period, each of the stages is removed and analyzed for Hg. At this stage, testing can be destructive because characterization of the species was done during sampling. Each one of the stages can be analyzed by acid digestion followed by atomic absorption spectrophotometry (AA) or induction-coupled plasma (ICP) or a number of other well-known spectrographic techniques.

In the instance of a gaseous stream the system 90 may be connected through a regulator at 1 to 80 pounds per square inch (psi). The system is typically engaged from 1 to 8 hours. At the end of the sampling period the system is disengaged and the three filtration stages are analyzed for content of the particular mercury species collected at the stage.

Once such an analysis is in hand, the data presents an accurate picture of the relative proportions of the three species of mercury present in the primary stream of interest, as well as the concentrations of the species. This analysis may then be dependably used to design a system for removing the mercury contamination from the primary stream. Thus e.g. the analysis can be used to establish that a specific number of filtration units corresponding to stage one of the present invention are required, a specified number of filtration units as in stage two, and a specific number of filtration units as in stage three.

While the present invention has been set forth in terms of specific embodiments thereof, the instant disclosure is such that numerous variations upon the invention are now enabled to those skilled in the art, which variations yet reside within the scope of the present teaching. Accordingly, the invention is to be broadly construed and limited only by the scope and spirit of the claims now appended hereto.

The invention claimed is:

1. A method for separating droplets of finely aerosolized elemental mercury from a gaseous stream in which the droplets are dispersed, comprising:
    contacting a metallic capillary surface with said gaseous stream, causing said droplets to deposit on said surface and by capillary action to coalesce with other of said droplets to form increasingly large drops of mercury,
    wherein the metallic capillary surface is comprised of braided strands of metal wire, the metal wire being made of a precious metal or a combination of precious metals, or the metal wire being made of a non-precious metal which is coated with a precious metal or a combination of precious metals;
    and wherein the said surface is oriented to allow the mercury drops to flow by gravitational forces and capillary action to the lowermost portion of said surface where it accumulates.

2. A method in accordance with claim 1, wherein the metal wire is made of silver, palladium, platinum, rhodium, or a combination thereof, or wherein the metal wire is made of copper which is coated with silver, palladium, platinum, rhodium, or a combination thereof.

3. A method in accordance with claim 1, wherein the metal wire is made of silver, or wherein the metal wire is made of copper which is coated with silver.

4. A method in accordance with claim 1, further comprising the step of collecting the accumulating mercury thereby separated it from the said gaseous stream.

5. A method in accordance with claim 1, wherein the capillary surface is defined at the surface of a wick made of the metal strands which are finely braided to form narrow interstices between the individual strands.

6. A method in accordance with claim 5, wherein said braided strands are flattened into a ribbon which is wound on a core with the said strands all extending in the longitudinal direction along the core, the capillary surface being defined at the surface of said wound ribbon.

7. A method in accordance with claim 1, wherein the said gaseous stream is prefiltered before being contacted with said capillary surface, to remove undesirable hydrocarbons and oily organic compounds dispersed as minute aerosolized particles or mists in the gaseous media.

8. A method in accordance with claim 7 wherein the prefiltration is effected by passing the gaseous stream through a gas pervious filtration media which has been infused with an absorption composition comprising a homogeneous thermal reaction product of an oil component selected from the group consisting of glycerides, fatty acids, alkenes and alkynes, and a methacrylate or acrylate polymer component, whereby the removed hydrocarbon and oily organic particles are immobilized at the media.

9. A method in accordance with claim 1, wherein the gaseous stream is generated by coal-fired power generation.

10. A filtration system for separating droplets of finely aerosolized elemental mercury from a gaseous stream in which the droplets are dispersed, comprising:
    a metallic capillary surface comprised of finely braided strands of metal wire, the metal wire being made of a precious metal or a combination of precious metals, or the metal wire being made of a non-precious metal which is coated with a precious metal or a combination of precious metals;

means for contacting said metallic capillary surface with said gaseous stream, causing said mercury droplets to deposit on said surface and by capillary action to coalesce with other of said droplets to form increasingly large drops of mercury;

and wherein the said capillary surface is oriented to allow the mercury drops to flow by gravitational forces and capillary action to the lowermost portion of said surface where it accumulates; and means for collecting the accumulating mercury thereby separated from the said gas stream.

11. A filtration system in accordance with claim 10, wherein the metal wire is made of silver, palladium, platinum, rhodium, or a combination thereof, or wherein the metal wire is made of copper which is coated with silver, palladium, platinum, rhodium, or a combination thereof.

12. A filtration system in accordance with claim 10, wherein the metal wire is made of silver, or wherein the metal wire is made of copper which is coated with silver.

13. A filtration system in accordance with claim 10, wherein the capillary surface is defined at the surface of a wick made of the metal strands which are finely braided to form narrow interstices between the individual strands.

14. A filtration system in accordance with claim 13, wherein said braided strands are flattened into a ribbon which is wound on a tube with the said strands extending in the longitudinal direction along the tube, the capillary surface being defined at the surface of said wound ribbon.

15. A filtration system in accordance with claim 10, further including means to prefilter the said gaseous stream before it is contacted with said cal pillary surface, to remove undesirable hydrocarbons and oily organic compounds dispersed as minute aerosolized particles or mists in the gaseous media.

16. A filtration system in accordance with claim 15, wherein the means for prefiltration comprises means for passing the gaseous stream through a gas pervious filtration media which has been infused with an absorption composition comprising a homogeneous thermal reaction product of an oil component selected from the group consisting of glycerides, fatty acids, alkenes and alkynes, and a methacrylate or acrylate polymer component, whereby the removed hydrocarbon and oily organic particles are immobilized at the media.

17. A filtration system in accordance with claim 14 further including means to prefilter the said gaseous stream before it is contacted with said capillary surface, to remove undesirable hydrocarbons and oily organic compounds dispersed as minute aerosolized particles or mists in the gaseous media;

wherein the prefiltration means is positioned coaxially and surrounding the said tube and the braid ribbon wound upon the tube, and the said tube have perforated walls; whereby the gaseous flow to be treated may be passed radially inward through said media and to the ribbon, thence into the tube interior from which it may flow having been cleaned of the aerosolized mercury, and the hydrocarbon and oily organic particles.

18. A filtration system in accordance with claim 10, including a tube having perforated walls; and further including means to prefilter the said gaseous stream before it is contacted with said capillary surface to remove undesirable hydrocarbons and oily organic compounds dispersed as minute aerosolized particles or mists in the gaseous media;

wherein the means for prefiltration comprises means for passing the gaseous stream through a gas pervious oleophilic filtration media which has been infused with an absorption composition comprising a homogeneous thermal reaction product of an oil component selected from the group consisting of glycerides, fatty acids, alkenes and alkynes, and a methacrylate or acrylate polymer component, whereby the removed hydrocarbon and oily organic particles are immobilized at the said oleophilic media;

wherein said braided strands are flattened into a ribbon, the capillary surface being defined at the surface of said ribbon which is wound on said tube with the said strands all extending in the longitudinal direction along the tube; and wherein the prefiltration means is positioned coaxially and surrounding the said tube; and wherein the braid ribbon is wound about the outside of the filtration media coaxially with the tube; whereby the gaseous flow to be treated may be passed to the interior of the tube, then radially outward through said oleophilic filtration media and to the ribbon, from which it may flow radially outward having been cleaned of the aerosolized mercury and the removed hydrocarbon and oily organic particles.

19. A filtration system for separating droplets of finely aerosolized elemental mercury from a gaseous stream in which the droplets are dispersed, comprising:

a generally enclosed mercury filtration tank having an inlet for receiving said gaseous stream and an outlet for discharging the gaseous stream after the said mercury has been removed;

a filter being positioned in said mercury filtration tank comprising a perforated wall tube wound with a metallic substrate having a metallic capillary surface comprised of finely braided strands of metal wire, the metal wire being made of a precious metal or a combination of precious metals, or the metal wire being made of a non-precious metal which is coated with a precious metal or a combination of precious metals;

means for flowing the gas stream entered into said tank through the said perforated wall of said tube and the wound substrate to effect contact of said metallic capillary surface of said substrate with said gaseous stream, causing said droplets to deposit on said surface and by capillary action to coalesce with other of said droplets to form increasingly large drops of mercury;

means for passing the gas stream having contacted said metallic capillary surface to the said gas discharge outlet;

the said tube and metallic capillary surface being oriented to allow the mercury drops to flow by gravitational forces and capillary action to the gravitationally lowermost portion of said surface where it accumulates; and means for collecting the accumulating mercury thereby separated from the said gas stream.

20. A filtration system in accordance with claim 19, wherein the said mercury filtration tank is divided by a cross plate into an upper chamber above the plate and a lower chamber below said plate; the gaseous stream inlet being in communication with one of said chambers, and the gaseous stream discharge outlet being in communication with the other; the said filters being in one of the two said chambers with the interior of said tube communicating with the other chamber; whereby the flow through said filter is either radially from the outside of the tube inwardly, or radially from the inside of the tube outward, depending on whether the interior of the tube or the exterior of the tube is the recipient via the chamber in which it is resident of the upstream flow of the gaseous stream.

21. A filtration system in accordance with claim 19, including a plurality of said filters in said mercury filtration tank.

22. A filtration system in accordance with claim 19, wherein the capillary surface is defined at the surface of a wick made of the metal strands which are finely braided to form narrow interstices between the individual strands which thereby provide said capillary surface at the wick's exterior, said wick comprising the said wound substrate.

23. A filtration system in accordance with claim 22, wherein said braided strands are flattened into a ribbon which is wound on said tube, with the said strands all extending in the longitudinal direction along the tube, the capillary surface being defined at the surface of said wound ribbon.

24. A filtration system in accordance with claim 19, wherein said metal strands comprise silver or silver-coated copper.

25. A filtration system in accordance with claim 19, wherein the said gas stream includes undesirable hydrocarbons and oily organic compounds dispersed as minute aerosolized particles or mists in the gaseous media; and further including means to prefilter the said gaseous stream before it is contacted with said capillary surface, to remove undesirable hydrocarbons and oily organic compounds;

and wherein the prefilter means comprises a gas pervious filtration media which has been infused with an absorption composition comprising a homogeneous thermal reaction product of an oil component selected from the group consisting of glycerides, fatty acids, alkenes and alkynes, and a methacrylate or acrylate polymer component, whereby the removed hydrocarbon and oily organic particles are immobilized at the media.

26. A filtration system in accordance with claim 25, wherein the said prefilter means comprises:

a generally enclosed prefiltration tank having an inlet for receiving said gaseous stream and an outlet for discharging the gaseous stream after the said hydrocarbons and oily organic compounds dispersed as minute aerosolized particles or mists in the gaseous media have been removed;

an oleophilic filter being positioned in said prefiltration tank;

means for flowing the gas stream entered into said prefiltration tank through the said oleophilic filter;

means for passing the gas stream having contacted said oleophilic filter to the said gas discharge outlet; and means connecting the outlet flow from said prefiltration tank to the inlet of the mercury filtration tank.

* * * * *